L. FISCHER,

Assignor to A. H. Watkins.

VAPOR-BURNER.

No. 7,706. Reissued May 29, 1877.

WITNESSES

B. N. Williams

John E. Fleming

INVENTOR

Louis Fischer

By his Attys.

Henry W. Williams & Co

THE NORRIS PETERS CO., PHOTO-LITHO., WASHINGTON, D. C.

UNITED STATES PATENT OFFICE.

LOUIS FISCHER, OF BROOKLYN, NEW YORK, ASSIGNOR TO ALBERT H. WATKINS, OF BOSTON, MASSACHUSETTS.

IMPROVEMENT IN VAPOR-BURNERS.

Specification forming part of Letters Patent No. 88,287, dated March 30, 1869; reissue No. 7,706, dated May 29, 1877; application filed April 24, 1877.

*To all whom it may concern:*

Be it known that I, LOUIS FISCHER, of the city of Brooklyn, in the county of Kings and State of New York, have made certain new and useful Improvements in Gas-Generating Burners; and I do hereby declare that the following is a full, clear, and exact description of the same, reference being had to the accompanying drawings, making part of the specification, in which—

Figure 1:
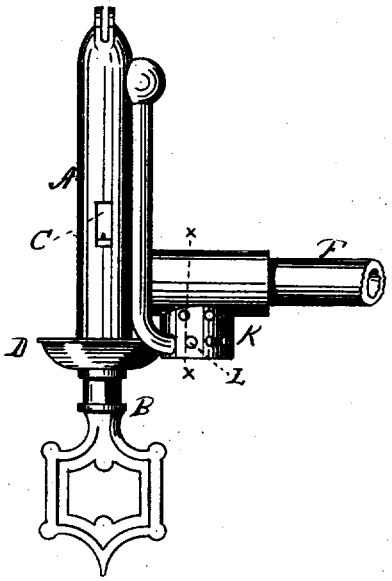
Figure 3:
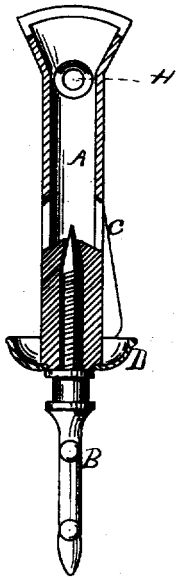
Figure 2:
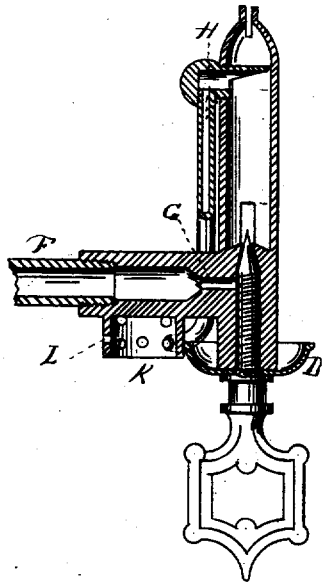
Figure 4:
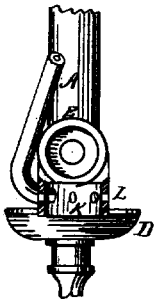

Figure 1 represents a side elevation of my improved burner. Fig. 2 is a longitudinal vertical section of the same. Fig. 3 is a vertical central section through the burner-tube of the same. Fig. 4 is a cross-section of the same, the plane of section being taken in the line *x x*, Fig. 1.

Similar letters of reference indicate corresponding parts.

This invention relates to the gas-burners which are adapted to generate the gas direct from oil, as it is consumed by the burner.

With the many attempts made heretofore in these burners, the leading result of producing the actual equivalent, large and brilliant flame, as from the ordinary non-generating gas-burners, has never been attained to satisfaction.

In most of the attempts heretofore made the result failed, either on account of not properly evaporating, or not generating and supplying sufficient gas for the required consumption of such flame, or on account of not applying the heating-jets at a point near enough to the generating-chamber.

My invention consists in the peculiar construction and arrangement of parts for passing a current of gas, after its commixture with air, from the upper part of the burner down toward the generating-chamber for the purpose of heating the said chamber.

To enable others skilled in the art to make and use my invention, I will proceed to describe its construction and operation.

A represents the usual burner-tube, provided with the slotted tip end for the gas-discharge on its upper extremity, while the lower part is furnished with the usual valve-screw, B, through which the gas enters, and by which its flow is regulated, and with the usual air-supply passages C C and the waste-cup D. E represents the gas-generator, or generating-chamber, to which the oil is furnished from the oil-basin through the feed-pipe F, and the vapors are conducted from the generator to the valve B through the passage G.

As it is impossible to obtain a jet of flame below a certain point in the mixing-chamber or burner-tube, (say, one-half to three-fourths of an inch above the oxygen-holes,) it is necessary, in order to apply sufficient heat to the generating-chamber, to conduct the oxygenized vapor to a point near to the said chamber, so that the flame may take effect. So, instead of employing means to impart extra heat to the upper part of the burner-tube, and in that manner conducting and imparting heat through the metal to the generating-chamber, I provide the passage H, from the upper portion of the burner-tube A, leading down to the generating-chamber. With the discharge of this passage H a gas-jet under or near the generating-chamber is obtained for the proper protection and distribution of heat therefrom. I provide the generating-chamber with the heating-chamber K projecting downward and surrounding the said gas-jet, and made with small openings L L, for the proper supply of air to this jet.

When the burner is used, the same is first heated in the usual way from the waste-cup. The gas-jet under the generator will light itself from the waste-cup, and, soon after, a brilliant gas-flame issues from the burner.

It will be seen that by means of the direct heating of the generating-chamber sufficient gas vapors are produced to furnish a large flame, while, at the same time, the passage H is no objectionable obstruction to the light; and, by these means, oil of heavier gravity can be used in such lamps, whereby less danger of accidents, encountered with the use of lamps with light oils, is risked.

Having thus fully described my invention, what I claim therein, and desire to secure by Letters Patent, is—

In a vapor-burner, a tube or passage arranged to conduct a portion of the oxygenized vapor from the mixing or gas chamber to a point below its communication with said gas-chamber for heating purposes.

LOUIS FISCHER.

Witnesses:
JAMES H. HUNTER,
ALBERT H. WATKINS.